(12) United States Patent
Dai et al.

(10) Patent No.: US 10,425,765 B2
(45) Date of Patent: Sep. 24, 2019

(54) POSITIONING METHOD AND CORRESPONDING TERMINAL AND SYSTEM

(71) Applicant: ZTE Corporation, Shenzhen, Guangdong (CN)

(72) Inventors: Bo Dai, Shenzhen (CN); Zhaohua Lu, Shenzhen (CN); Liujun Hu, Shenzhen (CN); Yong Li, Shenzhen (CN); Shijun Chen, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/519,343

(22) PCT Filed: Apr. 1, 2015

(86) PCT No.: PCT/CN2015/075715
§ 371 (c)(1),
(2) Date: Apr. 14, 2017

(87) PCT Pub. No.: WO2016/058340
PCT Pub. Date: Apr. 21, 2016

(65) Prior Publication Data
US 2017/0238131 A1  Aug. 17, 2017

(30) Foreign Application Priority Data
Oct. 17, 2014 (CN) .......................... 2014 1 0555403

(51) Int. Cl.
*H04W 4/02* (2018.01)
*G01S 5/02* (2010.01)
(Continued)

(52) U.S. Cl.
CPC ............ *H04W 4/02* (2013.01); *G01S 5/0036* (2013.01); *G01S 5/0252* (2013.01);
(Continued)

(58) Field of Classification Search
CPC ............ H04W 64/00; H04W 56/0015; H04W 64/003; H04W 8/02; G01S 5/0252; G01S 5/0268; G01S 5/06
See application file for complete search history.

(56) References Cited

U.S. PATENT DOCUMENTS 8,149,168 B1   4/2012 Rabinowitz
2009/0285162 A1  11/2009 Xie
(Continued)

FOREIGN PATENT DOCUMENTS

CN   101232708 A    7/2008
CN   101557414 A   10/2009
(Continued)

OTHER PUBLICATIONS

International Search Report in international application No. PCT/CN2015/075715, dated Jul. 1, 2015, 3 pgs.
(Continued)

*Primary Examiner* — Liton Miah
(74) *Attorney, Agent, or Firm* — McDonald Hopkins LLC (57) ABSTRACT

A positioning method and a corresponding terminal and system. A terminal acquires positioning information of the terminal, and sends the acquired positioning information to a first transmission node, the positioning information comprising at least one type of the following information: signal strength information, a subframe or subframe set index, channel characteristic information, access point information and environment characteristic information. The first transmission node transmits the positioning information to a positioning service system, and the positioning service system acquires the positioning information reported by the terminal and determines a geographic position of the terminal according to the positioning information. The present invention can satisfy related enhanced positioning demands.

7 Claims, 2 Drawing Sheets

```
                                    ┌─ 110
┌─────────────────────────────────────────────────────────┐
│  Acquire positioning information of the terminal, the   │
│  positioning information including at least one type    │
│  of the following information: signal intensity         │
│  information, a sub-frame or sub-frame set index,       │
│  channel characteristic information, access point       │
│  information and environment characteristic information │
└─────────────────────────────────────────────────────────┘
                              │
                              ▼   ┌─ 120
┌─────────────────────────────────────────────────────────┐
│ Send the acquired positioning information to a first    │
│ transmission node                                       │
└─────────────────────────────────────────────────────────┘
```

(51) Int. Cl.
*G01S 5/00* (2006.01)
*H04W 56/00* (2009.01)
*H04W 64/00* (2009.01)

(52) U.S. Cl.
CPC ......... *H04W 56/001* (2013.01); *H04W 64/00* (2013.01); *Y02D 70/00* (2018.01)

(56) References Cited

U.S. PATENT DOCUMENTS

| | | | |
|---|---|---|---|
| 2012/0052875 A1* | 3/2012 | Kangas | H04W 64/00 455/456.1 |
| 2012/0076122 A1 | 3/2012 | Wang | |
| 2013/0045759 A1 | 2/2013 | Smith | |
| 2014/0073356 A1* | 3/2014 | Siomina | G01S 5/0205 455/456.2 |
| 2014/0094188 A1 | 4/2014 | Kazmi et al. | |
| 2014/0176366 A1 | 6/2014 | Fischer et al. | |
| 2014/0179352 A1 | 6/2014 | V.M. et al. | |
| 2014/0200009 A1* | 7/2014 | Schier | H04W 64/00 455/446 |
| 2014/0235273 A1* | 8/2014 | Ahn | G01S 5/0236 455/456.1 |
| 2014/0273920 A1 | 9/2014 | Smith | |
| 2015/0024775 A1* | 1/2015 | Jung | H04W 64/003 455/456.1 |
| 2015/0230055 A1 | 8/2015 | Smith et al. | |
| 2015/0257121 A1* | 9/2015 | Siomina | H04W 64/003 455/456.6 |
| 2015/0281884 A1 | 10/2015 | Smith et al. | |
| 2015/0312840 A1* | 10/2015 | Kazmi | H04W 40/244 455/456.2 |
| 2015/0350836 A1 | 12/2015 | Smith | |
| 2015/0350837 A1 | 12/2015 | Smith | |
| 2015/0365801 A1 | 12/2015 | Smith et al. | |
| 2015/0382145 A1 | 12/2015 | Smith et al. | |
| 2016/0080910 A1 | 3/2016 | Smith et al. | |
| 2016/0084936 A1 | 3/2016 | Smith et al. | |
| 2016/0094949 A1 | 3/2016 | Smith | |
| 2016/0212581 A1 | 7/2016 | Smith | |
| 2016/0234803 A1 | 8/2016 | Smith et al. | |
| 2017/0055128 A1 | 2/2017 | Smith | |
| 2017/0078847 A1 | 3/2017 | Smith et al. | |
| 2017/0079008 A1 | 3/2017 | Smith et al. | |
| 2017/0111768 A1 | 4/2017 | Smith et al. | |
| 2017/0156034 A1 | 6/2017 | Smith | |

FOREIGN PATENT DOCUMENTS

| | | |
|---|---|---|
| CN | 101754435 A | 6/2010 |
| CN | 101795466 A | 8/2010 |
| CN | 101883382 A | 11/2010 |
| CN | 101931858 A | 12/2010 |
| CN | 101965051 A | 2/2011 |
| CN | 101986747 A | 3/2011 |
| CN | 103096459 A | 5/2013 |
| CN | 103731800 A | 4/2014 |
| EP | 2374310 A1 | 10/2011 |
| EP | 2426999 A1 | 3/2012 |

OTHER PUBLICATIONS

English Translation of the Written Opinion of the International Search Authority in international application No. PCT/CN2015/075715, dated Jul. 1, 2015, 15 pgs.

Supplementary European Search Report in European application No. 15851142.8, dated Aug. 3, 2017, 16 pgs.

* cited by examiner

POSITIONING METHOD AND CORRESPONDING TERMINAL AND SYSTEM

TECHNICAL FIELD

The disclosure relates to the field of positioning technology of a terminal, and in particular, to a positioning method of a terminal and a corresponding terminal and system.

BACKGROUND

With the continuous development of the times, the positioning technology is gaining more and more attention. The high-precision positioning demand, especially the meter-level positioning accuracy, is a higher technical requirement put forward on the wireless positioning for indoor scene and the like.

For the GPS positioning technology, the indoor signal becomes weak for reasons of signal losses and the like, so that the positioning terminal (such as User Equipment, UE) cannot search for sufficient stars; due to large positioning error, cellular network system cannot reach enough accuracy in the outdoors or indoors, and cannot satisfy the demand of wireless positioning.

LTE supports the positioning based on downlink Positioning Reference Signals (PRS) and the positioning based on an uplink signal (SRS/DMRS). However, the energy loss and multipath delay of the signals in the indoor scene and the like will lead to increasing errors of the relevant positioning method. Moreover, as the positioning accuracy requirement increases and new requirements such as vertical positioning are proposed, the relevant positioning method and the corresponding terminal, transmission system and positioning service system cannot satisfy the demand.

SUMMARY

In view of this, the technical problem to be solved by the disclosure is to provide a positioning method of a terminal and a corresponding terminal and system so as to improve the positioning accuracy.

There is provided a positioning method applied to a terminal, including: acquiring positioning information of the terminal; and sending the acquired positioning information to a first transmission node. The positioning information includes at least one type of the following information: signal intensity information, a sub-frame or sub-frame set index, channel characteristic information, access point information and environment characteristic information.

In an embodiment, the signal intensity information includes: intensity information of a positioning signal received by the terminal from a second transmission node. The sub-frame or sub-frame set index includes: index information of a sub-frame or sub-frame set for which a strongest positioning signal is detected by the terminal from a plurality of sub-frames or a plurality of sub-frame sets on which the positioning signal is transmitted from a second transmission node in different transmission manners, at least one of the following transmission parameters being different in the different transmission manners: a transmission port, a beam direction, a precoding mode and a number of re-transmission sub-frames. The channel characteristic information includes at least one of intensity information of the positioning signal received by the terminal from the second transmission node, multipath information of the positioning signal and precoding mode information of a reference signal.

The second transmission node is the same as or different from the first transmission node.

In an embodiment, the environment characteristic information includes at least one of vertical height information, horizontal position information, water depth information, air pressure information, temperature information, humidity information, wind power information, gravity information and hydraulic pressure information provided by a sensor module in the terminal.

In an embodiment, the positioning information further includes: time advance amount information of the positioning signal received by the terminal from the transmission node.

In an embodiment, the access point information includes information of k access points detected by the terminal, where k is an integer greater than or equal to one, the information of the k access points including at least one of identification information of the k access points, intensity information of signals of the k access points, time advance amount information of the signal of the k access points, and channel characteristic information between the k access points and the terminal.

In an embodiment, the k access points detected by the terminal refer to:

k access points detected by the terminal with the largest signal intensity, where k≤K, and K is a preset value; or k access points with the largest signal intensity among access points detected by the terminal with signal intensity exceeding a threshold, where k≤K, and K is a preset value; or k access points detected by the terminal with signal intensity exceeding a threshold, where k is a number of access points with the actually detected signal intensity exceeding a threshold.

In an embodiment, before acquiring the positioning information of the terminal, the method further includes: determining a type of the positioning information to be acquired according to type information for the positioning information to be reported by the terminal and configured by the network side; or determining a type of the positioning information to be acquired by convention; or determining, by the terminal itself, a type of the positioning information to be acquired.

In view of the above, the disclosure further provides a positioning method applied to at least one transmission node of a wireless network, including: sending, by a third transmission node, at least one of transmission position information of a positioning signal and type information for positioning information to be reported by a terminal to the terminal; and receiving, by a first transmission node, the position information reported by the terminal, the first transmission node being the same as or different from the third transmission node. The positioning information includes at least one type of the following information: signal intensity information, a sub-frame or sub-frame set index, channel characteristic information, access point information and environment characteristic information.

In an embodiment, the transmission position information of the positioning signal includes identification information of a plurality of sub-frames or a plurality of sub-frame sets on which the positioning signal is sent by each of cooperative transmission nodes for terminal positioning; and each of cooperative transmission nodes sends the positioning signal on different sub-frames or sub-frame sets in one of different transmission manners; and at least one of the following transmission parameters is different in the different transmission manners: a transmission port, a beam direction, a precoding mode and a number of re-transmission sub-frames.

In an embodiment, the first transmission node is a node of a mobile communication network, or a node of a wireless local area network, or a node of a Global Positioning System (GPS) system; and the third transmission node is a node of a mobile communication network, or a node of a wireless local area network, or a node of a GPS system.

In an embodiment, the transmission position information of the positioning signal and/or the type information for the position information to be reported by the terminal are configured by a positioning service system for the third transmission node; and/or after receiving, the first transmission node, the positioning information reported by the terminal, the method further includes: transmitting the positioning information to the positioning service system.

In view of the above, the disclosure also provides a positioning method applied to a positioning service system, including:

acquiring, by the positioning service system, positioning information reported by a terminal; and determining, by the positioning service system, a geographic position of the terminal according to the positioning information. The positioning information includes at least one type of the following information: signal intensity information, a sub-frame or sub-frame set index, channel characteristic information, access point information and environment characteristic information.

In an embodiment, the positioning information includes information of k access points detected by the terminal, where k is an integer greater than or equal to one, the information of the k access points including identification information of the k access points. The step of determining, by the positioning service system, a geographic position of the terminal according to the positioning information includes: determining, by the positioning service system, geographic positions of the k access points according to the identification information of the k access points reported by the terminal and an established mapping relationship between the identification information and the geographic positions of the access points, and then determining, by the positioning service system, the geographic position of the terminal according to the geographic positions of the k access points.

In an embodiment, the method further includes establishing, by the positioning service system, a mapping relationship between the identification information and the geographic positions of the access points in the following manner:

establishing, by the positioning service system, a mapping relationship between the access points and associated physical ports according to the information reported by the access points or a user; and establishing, by the positioning service system, a mapping relationship between the physical ports and the geographic positions according to a network layout or a network planning or an access point report; or directly establishing, by the positioning service system, the mapping relationship between the identification information and the geographic positions of the access points according to the access points or the identification information and the geographic positions of the access points reported by the terminal accessing the access point.

In an embodiment, the step of determining, by the positioning service system, a geographic position of the terminal according to the geographic positions of the k access points includes: determining, by the positioning service system, a geographic area that each of signals of the k access points covers according to the geographic positions of the k access points and coverage of signals of the access points, and using, by the positioning service system, the geographic area commonly covered by the signals of the k access points as a geographic area where the terminal is located.

In an embodiment, the information of the k access points further includes at least one of intensity information of the signals of the k access points, time advance amount information of the signals of the k access points, and channel characteristic information between the k access points and the terminal. The positioning service system determines the geographic position of the terminal according to the geographic positions of the k access points, using one or a combination of the following manners:

determining, by the positioning service system, distances from the terminal to the k access points according to the intensity information and/or the time advance amount information of the signals of the k access points respectively, and determining, by the positioning service system, the geographic position of the terminal according to the geographic positions of the k access points; and searching, by the positioning service system, an established mapping relationship between the geographic position and the channel characteristic information between the access points and the terminal according to the channel characteristic information between the k access points and the terminal, and determining the matched geographic position as the geographic position of the terminal.

In an embodiment, the positioning information further includes: time advance amount information of the positioning signal received by the terminal from each of cooperative transmission nodes for terminal positioning. The step of determining, by the positioning service system, the geographic position of the terminal according to the position information includes:

determining, by the positioning service system, a distance from the terminal to each of cooperative transmission nodes according to the time advance amount information of the positioning signal received from each of the cooperative transmission nodes and reported by the terminal respectively, and then determining, by the positioning service system, the geographic position of the terminal according to the geographic position of each of cooperative transmission nodes; determining, by the positioning service system, the geographic position of the terminal according to at least one of the position information including the signal intensity information, the sub-frame or sub-frame set index, the channel characteristic information, the access point information, and the environment characteristic information reported by the terminal; and then determining, by the positioning service system, final geographic position information of the terminal according to a plurality of geographic positions of the terminal determined in a plurality of manners.

In an embodiment, before the step of acquiring, by the positioning server, the positioning information reported by the terminal, the method further includes: configuring, by the positioning server, the transmission position information of the positioning signal and/or the type information for the positioning information to be reported by the terminal, and sending, by the positioning server, the transmission position information of the positioning signal and/or the type information for the positioning information to be reported by the terminal as configured through the transmission nodes to the terminal. The transmission position information of the positioning signal includes identification information of a plurality of sub-frames or a plurality of sub-frame sets on which the positioning signal is sent by each of cooperative transmission nodes for terminal positioning.

In an embodiment, the positioning information includes a sub-frame or a sub-frame set index, the sub-frame or sub-frame set index including index information of a sub-frame or sub-frame set for which a strongest positioning signal is detected by the terminal from a plurality of sub-frames or a plurality of sub-frame sets on which the positioning signal is transmitted from each of the cooperative transmission nodes in different transmission manners, and at least one of the following transmission parameters being different in the different transmission manners: a transmission port, a beam direction and a precoding mode, and each of the transmission port and the precoding mode corresponds to the beam direction. Before the step of determining, by the positioning service system, the geographic position of the terminal according to the positioning information, the method further includes: acquiring, by the positioning service system, correspondence between indexes of a plurality of sub-frames or sub-frame sets, on which each of the cooperative transmission nodes sends the positioning signal, and the transmission manners according to configuration information. The step of determining, by the positioning service system, the geographic position of the terminal according to the positioning information includes: determining, by the positioning service system, corresponding transmission manner of each of the cooperative transmission nodes according to the index of the sub-frame or sub-frame set reported by the terminal, so as to determine angle information of the terminal with respect to each of the cooperative transmission nodes, and then determining the geographic position of the terminal according to the geographic position of each of the cooperative transmission nodes.

In an embodiment, the positioning information includes signal intensity information, the signal intensity information including positioning signal intensity information received by the terminal from each of cooperative transmission nodes for terminal positioning. The step of determining, by the positioning service system, the geographic position of the terminal according to the positioning information includes: determining, by the positioning service system, distance from the terminal to each of the cooperative transmission nodes according to the positioning signal intensity information received from each of the cooperative transmission nodes and reported by the terminal, respectively, and then determining the geographic position of the terminal according to geographic positions of each of the cooperative transmission nodes as stored.

In an embodiment, the positioning information includes channel characteristic information. Before the step of determining, by the positioning service system, the geographic position of the terminal according to the positioning information, the method further includes: establishing, by the positioning service system, a mapping relationship between the channel characteristic information and the geographic position of the terminal according to the geographic position associated with the channel characteristic information reported by the terminal. The step of determining, by the positioning service system, the geographic position of the terminal according to the positioning information includes: searching, by the positioning service system, an established mapping relationship between the channel characteristic information and the geographic position of the terminal according to the channel characteristic information reported by the terminal, and determining, by the positioning service system, the geographic position of the terminal.

In view of the above, the disclosure further provides a positionable terminal, including an information acquiring module configured to acquire positioning information of the terminal; and an information sending module configured to transmit the acquired positioning information to a first transmission node. The positioning information includes at least one type of the following information: signal intensity information, a sub-frame or sub-frame set index, channel characteristic information, access point information and environment characteristic information.

In an embodiment, in the positioning information acquired by the information acquiring module:

the signal intensity information includes intensity information of a positioning signal received by the terminal from a second transmission node, the second transmission node being the same as or different from the first transmission node;

the sub-frame or sub-frame set index includes: index information of a sub-frame or sub-frame set for which a strongest positioning signal is detected by the terminal from a plurality of sub-frames or a plurality of sub-frame sets on which the positioning signal is transmitted from a second transmission node in different transmission manners, at least one of the following transmission parameters being different in the different transmission manners: a transmission port, a beam direction, a precoding mode and a number of re-transmission sub-frames;

the channel characteristic information includes at least one of intensity information of the positioning signal received by the terminal from the second transmission node, multipath information of the positioning signal and precoding mode information of a reference signal; and the environment characteristic information includes at least one of vertical height information, horizontal position information, water depth information, air pressure information, temperature information, humidity information, wind power information, gravity information and hydraulic pressure information provided by a sensor module in the terminal.

In an embodiment, the positioning information acquired by the information acquiring module further includes: time advance amount information of the positioning signal received by the terminal from the transmission node.

In an embodiment, the terminal further includes an access point detecting module configured to detect the access point. The positioning information acquired by the information acquiring module includes at least one of identification information of k access points detected by the access point detecting module, intensity information of signals of the k access points, time advance amount information of the signal of the k access points, and channel characteristic information between the k access points and the terminal, where k is an integer greater than or equal to one. The k access points detected by the access point detecting module refer to: k access points detected with the largest signal intensity, where k≤K, and K is a preset value; or k access points with the largest signal intensity among access points detected with signal intensity exceeding a threshold, where k≤K, and K is a preset value; or k access points detected with signal intensity exceeding a threshold, where k is a number of access points with the actually detected signal intensity exceeding a threshold.

In an embodiment, the information acquiring module is further configured to: before acquiring the positioning information of the terminal, determine a type of the positioning information to be acquired according to type information for the positioning information to be reported by the terminal and configured by the network side; or determine a type of the positioning information to be acquired by convention; or determine a type of the positioning information to be acquired by itself.

In view of the above, the disclosure further provides a transmission system for terminal positioning, including a first transmission node configured to receive the position information reported by the terminal; and a third transmission node configured to send transmission position information of a positioning signal and/or type information for positioning information to be reported by the terminal to the terminal, the third transmission node being the same as or different from the first transmission node. The positioning information includes at least one type of the following information: signal intensity information, a sub-frame or sub-frame set index, channel characteristic information, access point information and environment characteristic information.

In an embodiment, the transmission position information of the positioning signal sent by the third transmission node includes identification information of a plurality of sub-frames or a plurality of sub-frame sets on which the positioning signal is sent by each of cooperative transmission nodes for terminal positioning; and each of the cooperative transmission nodes sends the positioning signal on different sub-frames or sub-frame sets in different transmission manners; and at least one of the following transmission parameters is different in the different transmission manners: a transmission port, a beam direction, a precoding mode and a number of re-transmission sub-frames.

In an embodiment, the first transmission node is a node of a mobile communication network, or a node of a wireless local area network, or a node of a Global Positioning System (GPS) system; and the third transmission node is a node of a mobile communication network, or a node of a wireless local area network, or a node of a GPS system.

In an embodiment, the transmission position information of the positioning signal and/or the type information for the position information to be reported by the terminal are configured by a positioning service system to the third transmission node; and/or after receiving the positioning information reported by the terminal, the first transmission node further transmits the positioning information to the positioning service system.

In view of the above, the disclosure further provides a positioning service system, including an information acquiring module configured to acquire positioning information reported by a terminal; and a terminal positioning module configured to determine a geographic position of the terminal according to the positioning information. The positioning information includes at least one type of the following information: signal intensity information, a sub-frame or sub-frame set index, channel characteristic information, access point information and environment characteristic information.

In an embodiment, the positioning information acquired by the information acquiring module includes identification information of k access points detected by the terminal, where k is an integer greater than or equal to one. Determining by the terminal positioning module a geographic position of the terminal according to the positioning information includes: determining geographic positions of the k access points according to the identification information of the k access points reported by the terminal and an established mapping relationship between the identification information and the geographic positions of the access points, and then determining the geographic position of the terminal according to the geographic positions of the k access points.

In an embodiment, the terminal positioning module establishes a mapping relationship between the identification information and the geographic positions of the access points in the following manner:

establishing a mapping relationship between the access points and associated physical ports according to information reported by the access point or a user; and establishing a mapping relationship between the physical ports and the geographic positions according to a network layout or a network planning or an access point report; or directly establishing the mapping relationship between the identification information and the geographic position of the access points according to the access points or the identification information and the geographic positions of the access points reported by the terminal accessing the access points.

In an embodiment, determining by the terminal positioning module a geographic position of the terminal according to the geographic positions of the k access points includes: determining a geographic area that each of signals of the k access points covers according to the geographic positions of the k access points and coverage of the signals of the k access points, and regarding the geographic area commonly covered by the signals of the k access points as the geographic area where the terminal is located.

In an embodiment, the information of the k access points acquired by the information acquiring module further includes at least one of intensity information of the signals of the k access points, time advance amount information of the signals of the k access points, and channel characteristic information between the k access points and the terminal; the terminal positioning module determines the geographic position of the terminal according to the geographic positions of the k access points using one or a combination of the following manners:

determining a distance from the terminal to the k access points according to the intensity information and/or the time advance amount information of the signals of the k access points respectively, and determining the geographic position of the terminal according to the geographic positions of the k access points; and searching an established mapping relationship between a geographic position and the channel characteristic information between the access points and the terminal according to the channel characteristic information between the k access points and the terminal, and determining the matched geographic position as the geographic position of the terminal.

In an embodiment, the positioning information acquired by the information acquiring module further includes: time advance amount information of the positioning signal received by the terminal from each of cooperative transmission nodes for terminal positioning. Determining by the terminal positioning module the geographic position of the terminal according to the position information includes: determining a distance from the terminal to each of the cooperative transmission nodes according to the time advance amount information of the positioning signal received from each of the cooperative transmission nodes and reported by the terminal respectively, and determining the geographic position of the terminal according to the geographic position of each of the cooperative transmission nodes; determining the geographic position of the terminal according to the at least one of the position information in the signal intensity information, the sub-frame or sub-frame set index, the channel characteristic information, the access point information, and the environment characteristic information reported by the terminal; and then determining a final geographic position information of the terminal according to a plurality of geographic positions of the terminals determined in a plurality of manners.

In an embodiment, the positioning service system further includes an information configuration module configured to configure the transmission position information of the positioning signal and/or the type information for the positioning information to be reported by the terminal, and send the transmission position information of the positioning signal and/or the type information for the positioning information to be reported by the terminal as configured through the transmission node to the terminal. The transmission position information of the positioning signal includes identification information of a plurality of sub-frames or a plurality of sub-frame sets on which the positioning signal is sent by each of the cooperative transmission nodes for terminal positioning.

In an embodiment, the positioning information acquired by the information acquiring module includes a sub-frame or a sub-frame set index, the sub-frame or sub-frame set index including index information of a sub-frame or sub-frame set for which a strongest positioning signal is detected by the terminal from a plurality of sub-frames or a plurality of sub-frame sets on which the positioning signal is transmitted from each of the cooperative transmission nodes in different transmission manners, and at least one of the following transmission parameters being different in the different transmission manners: a transmission port, a beam direction and a precoding mode, and each of the transmission port and the precoding mode corresponds to the beam direction. The terminal positioning module is further configured to: acquire, according to the configuration information, correspondence between indexes of a plurality of sub-frames or sub-frame sets and the transmission manner, on which each of the cooperative transmission nodes sends the positioning signal, before determining the geographic position of the terminal according to the positioning information. The terminal positioning module is configured to determine the geographic position of the terminal according to the positioning information in the following manner: determining corresponding transmission manner of each of the cooperative transmission nodes according to the index of the sub-frame or sub-frame set reported by the terminal so as to acquire angle information of the terminal with respect to each of the cooperative transmission nodes, and determining the geographic position of the terminal according to the geographic position of each of the cooperative transmission nodes.

In an embodiment, the positioning information acquired by the information acquiring module includes positioning signal intensity information received by the terminal from each of the cooperative transmission nodes for terminal positioning. The terminal positioning module is configured to determine the geographic position of the terminal according to the positioning information in the following manner: determining a distance from the terminal to each of the cooperative transmission nodes according to the positioning signal intensity information received from each of the cooperative transmission nodes and reported by the terminal respectively, and then determining the geographic position of the terminal according to a stored geographic position of each of the cooperative transmission nodes.

In an embodiment, the positioning information acquired by the information acquiring module includes channel characteristic information reported by the terminal. The terminal positioning module is further configured to: establish a mapping relationship between a geographic position and the channel characteristic information of the terminal according to the geographic position associated with the channel characteristic information reported by the terminal. The terminal positioning module is configured to determine the geographic position of the terminal according to the positioning information in the following manner: searching, by the positioning service system, the established mapping relationship between the geographic position and the channel characteristic information of the terminal according to the channel characteristic information reported by the terminal, and determining, by the positioning service system, the geographic position of the terminal.

With the above solution, the terminal feeds back the above specific positioning information to the transmission node such as the base station, and the transmission node transmits the positioning information to the positioning service system. After acquiring the positioning information, the positioning service system can realize more precise positioning, or realize positioning in a new manner and system, or realize special positioning such as positioning of height and water depth. Thus, the related enhanced positioning demands may be satisfied.

BRIEF DESCRIPTION OF THE DRAWINGS

The drawings in the embodiment of the disclosure are described below to provide further understanding of the disclosure, are adopted together with the specification to explain the disclosure, and are not to be construed as limiting the scope of protection of the disclosure.

DETAILED DESCRIPTION

The specific embodiments of the disclosure are described below with reference to the drawings in detail. It is to be understood that the described specific embodiments are merely given for describing and explaining the disclosure and are not intended to limit the disclosure, and the embodiments and the characteristics in the embodiments of the present application may be arbitrarily combined with each other under the condition of no conflicts.

First Embodiment

Figure 1:
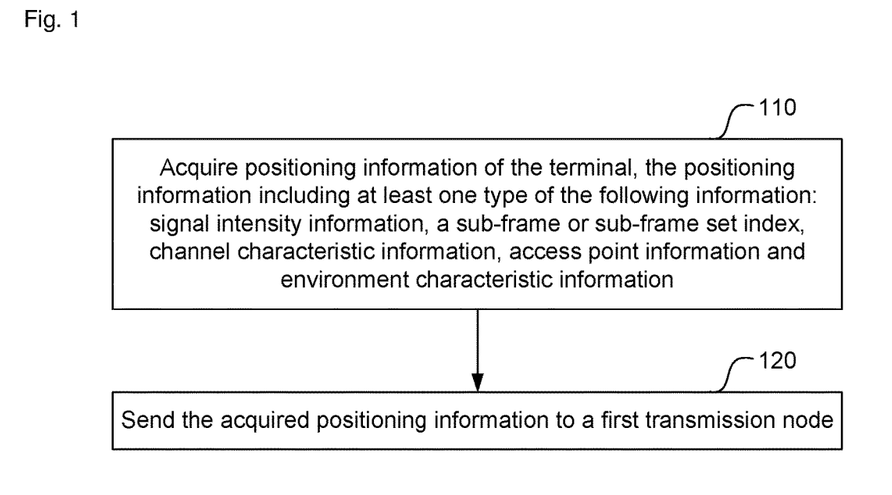
FIG. 1 is a flow diagram of a positioning method applied to a terminal according to a first embodiment of the disclosure.

The positioning of the terminal in the present embodiment is done together by a terminal (including but not limited to a mobile terminal (UE)), a transmission node and a positioning service system. Herein, a positioning method applied to the terminal is shown in FIG. 1, including the following steps.

At Step 110: positioning information of the terminal is acquired, and the positioning information includes at least one type of the following information: signal intensity information, a sub-frame or sub-frame set index, channel characteristic information, access point information and environment characteristic information.

Before acquiring the positioning information of the terminal, the terminal determines a type of the positioning information to be acquired according to type information for the positioning information to be reported by the terminal and configured by the network side, for example, according to the configuration, a sub-frame or the sub-frame set index or the access point information is reported, or the signal intensity information and the sub-frame or sub-frame set index, and the like are reported at the same time. In other embodiments, however, the terminal may also determine the type of the positioning information to be acquired by convention. Alternatively, the terminal itself determines the type of the positioning information to be acquired.

In the above the positioning information, the signal intensity information includes: intensity information of a positioning signal received by the terminal from a second transmission node, the second transmission node being the same as or different from the first transmission node.

The sub-frame or sub-frame set index includes: index information of a sub-frame or sub-frame set for which a strongest positioning signal is detected by the terminal from a plurality of sub-frames or a plurality of sub-frame sets on which the positioning signal is transmitted from a second transmission node in different transmission manners, at least one of the following transmission parameters being different in the different transmission manners: a transmission port, a beam direction, a precoding mode and a number of re-transmission sub-frames.

The channel characteristic information includes at least one of intensity information of the positioning signal received by the terminal from the second transmission node, multipath information of the positioning signal and precoding mode information of a reference signal. The multipath information may include at least one of a number of paths whose power exceeds a threshold, delay of each of the paths, and power of each of the paths, and the reference signal may be a positioning signal or other signals such as a pilot signal.

The environment characteristic information includes at least one of vertical height information, horizontal position information, water depth information, air pressure information, temperature information, humidity information, wind power information, gravity information and hydraulic pressure information provided by a sensor module in the terminal.

The access point information includes information of k access points (referring to access point(s) of a wireless network such as a WLAN) detected by the terminal, where k is an integer greater than or equal to one, the information of the k access points including at least one of identification information of the k access points, intensity information of signals of the k access points, time advance amount information of the signal of the k access points, and channel characteristic information between the k access points and the terminal. The k access points may be: k access points detected by the terminal with the largest signal intensity, where k≤K, and K is a preset value; or k access points with the largest signal intensity among access points detected by the terminal with signal intensity exceeding a threshold, where k≤K, and K is a preset value; or k access points detected by the terminal with signal intensity exceeding a threshold, where k is a number of access points with the actually detected signal intensity exceeding a threshold.

In another embodiment, in addition to the above information, the positioning information acquired by the terminal further includes: time advance amount information of the positioning signal received by the terminal from the transmission node.

At Step 120: the acquired positioning information is sent to a first transmission node.

The first transmission node and the second transmission node may be nodes of a mobile communication network, or nodes of a wireless local area network, or nodes of a GPS system.

In the disclosure, the positioning signal refers to a signal for terminal positioning that the second transmission node sends to the terminal, such as the downstream signal PRS and the upstream signal SRS/DMRS in LTE, but is not limited thereto.

Figure 2:
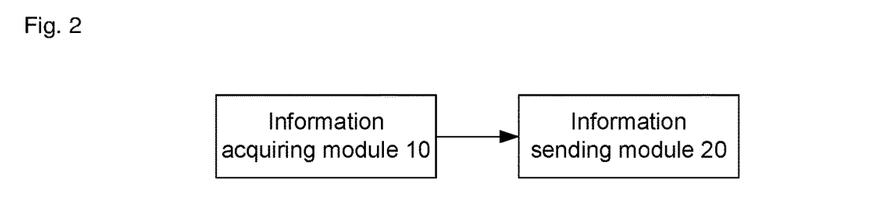
FIG. 2 is a module diagram of a positionable terminal according to a first embodiment of the disclosure.

Accordingly, as shown in FIG. 2, a positionable terminal provided by the disclosure includes: an information acquiring module 10 configured to acquire positioning information of the terminal; and an information sending module 20 configured to send the acquired positioning information to a first transmission node. The positioning information includes at least one type of the following information: signal intensity information, a sub-frame or sub-frame set index, channel characteristic information, access point information and environment characteristic information.

In an embodiment, in the positioning information acquired by the information acquiring module:

the signal intensity information includes intensity information of a positioning signal received by the terminal from a second transmission node, and the second transmission node is the same as or different from the first transmission node;

the sub-frame or sub-frame set index includes: index information of a sub-frame or sub-frame set for which a strongest positioning signal is detected by the terminal from a plurality of sub-frames or a plurality of sub-frame sets on which the positioning signal is transmitted from a second transmission node in different transmission manners, at least one of the following transmission parameters being different in the different transmission manners: a transmission port, a beam direction, a precoding mode and a number of re-transmission sub-frames;

the channel characteristic information includes at least one of intensity information of the positioning signal received by the terminal from the second transmission node, multipath information of the positioning signal and precoding mode information of a reference signal; and the environment characteristic information includes at least one of vertical height information, horizontal position information, water depth information, air pressure information, temperature information, humidity information, wind power information, gravity information and hydraulic pressure information provided by a sensor module in the terminal.

In an embodiment, the positioning information acquired by the information acquiring module further includes: time advance amount information of the positioning signal received by the terminal from the transmission node.

In an embodiment, the terminal further includes an access point detecting module configured to detect the access point;

the positioning information acquired by the information acquiring module includes at least one of identification information of k access points detected by the access point detecting module, intensity information of signals of the k access points, time advance amount information of the signal of the k access points, and channel characteristic information between the k access points and the terminal, where k is an integer greater than or equal to one; and the k access points detected by the access point detecting module refer to: k access points detected with the largest signal intensity, where k≤K, and K is a preset value; or k access points with the largest signal intensity among access points detected with signal intensity exceeding a threshold, where k≤K, and K is a preset value; or k access points detected with signal intensity exceeding a threshold, where k is a number of access points with the actually detected signal intensity exceeding a threshold.

In an embodiment, before acquiring the positioning information of the terminal, the information acquiring module is further configured to: determine a type of the positioning information to be acquired according to type information for the positioning information to be reported by the terminal and configured by the network side; or determine a type of the positioning information to be acquired by convention; or determine a type of the positioning information to be acquired by itself.

Figure 3:
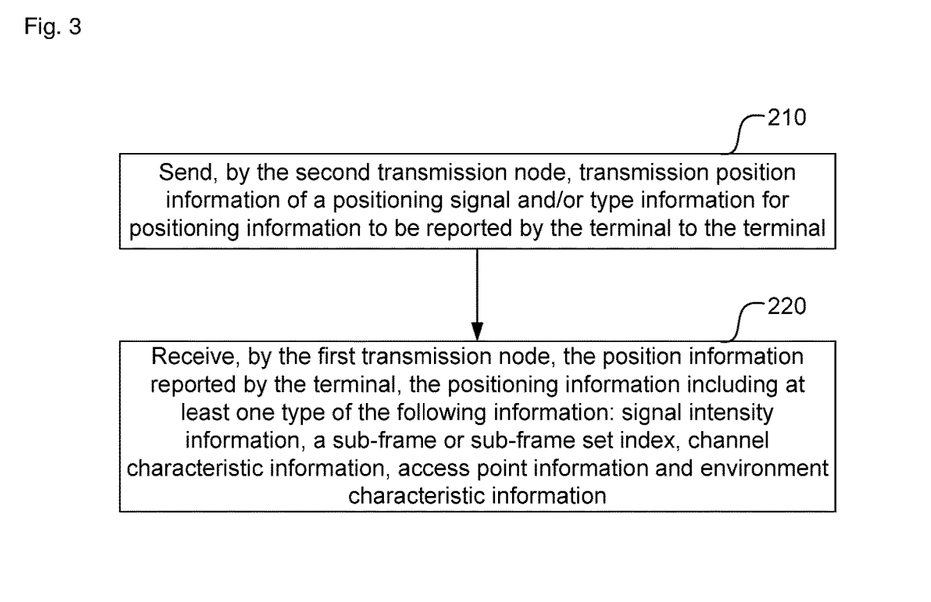
FIG. 3 is a flow diagram of a positioning method applied to a transmission node according to a first embodiment of the disclosure.

In the present embodiment, a positioning method applied to a transmission node of a wireless network is shown in FIG. 3, including the following steps.

At Step 210: the third transmission node sends transmission position information of a positioning signal and/or type information for positioning information to be reported by the terminal to the terminal.

The transmission position information of the above positioning signal includes identification information (such as an index) of a plurality of sub-frames or a plurality of sub-frame sets on which the positioning signal is sent by each of cooperative transmission nodes for terminal positioning; and each of the cooperative transmission nodes sends the positioning signal on different sub-frames or sub-frame sets in different transmission manners; and at least one of the following transmission parameters is different in the different transmission manners: a transmission port, a beam direction, a precoding mode and a number of re-transmission sub-frames.

The transmission position information of the above positioning signal and/or the type information for the position information to be reported by the terminal are configured by a positioning service system to the third transmission node.

After receiving the positioning information reported by the terminal, the first transmission node further transmits the positioning information to the positioning service system.

At Step 220: the first transmission node receives the position information reported by the terminal, the positioning information includes at least one type of the following information: signal intensity information, a sub-frame or sub-frame set index, channel characteristic information, access point information and environment characteristic information.

As described above, the first transmission node may be the same as or different from the third transmission node, and may be a node of a mobile communication network, or a node of a wireless local area network, or a node of a GPS system. The network where the first transmission node is located may be the same as or different from the network where the third transmission node is located.

In one example, the cooperative transmission node may include at least one of a base station, a relay station, and other nodes for positioning, which cooperate with each other to complete the terminal positioning. The third transmission node may be a base station or a relay station to which the terminal is connected. The third transmission node and the second transmission node may be the same or different. If the second transmission node is a cooperative transmission node, the third transmission node may be one of the cooperative transmission nodes or may not be a cooperative transmission node.

Accordingly, the present embodiment provides a transmission system for terminal positioning, including a first transmission node and a third transmission node.

The first transmission node is configured to receive the position information reported by the terminal, the positioning information includes at least one type of the following information: signal intensity information, a sub-frame or sub-frame set index, channel characteristic information, access point information and environment characteristic information.

The third transmission node is configured to send transmission position information of a positioning signal and/or type information for positioning information to be reported by the terminal to the terminal, the third transmission node being the same as or different from the first transmission node.

In an embodiment, the transmission position information of the positioning signal sent by the third transmission node includes information of a plurality of sub-frames or a plurality of sub-frame sets on which the positioning signal is sent by each of cooperative transmission nodes for terminal positioning; and each of the cooperative transmission nodes sends the positioning signal on different sub-frames or sub-frame sets in different transmission manners; and at least one of the following transmission parameters is different in the different transmission manners: a transmission port, a beam direction, a precoding mode and a number of re-transmission sub-frames.

In an embodiment, the first transmission node is a node of a mobile communication network, or a node of a wireless local area network, or a node of a GPS system; and the third transmission node is a node of a mobile communication network, or a node of a wireless local area network, or a node of a GPS system.

In an embodiment, the transmission position information of the positioning signal and/or the type information for the position information to be reported by the terminal are configured by a positioning service system to the third transmission node; and/or after receiving the positioning information reported by the terminal, the first transmission node further includes: transmitting the positioning information to the positioning service system.

Figure 4:
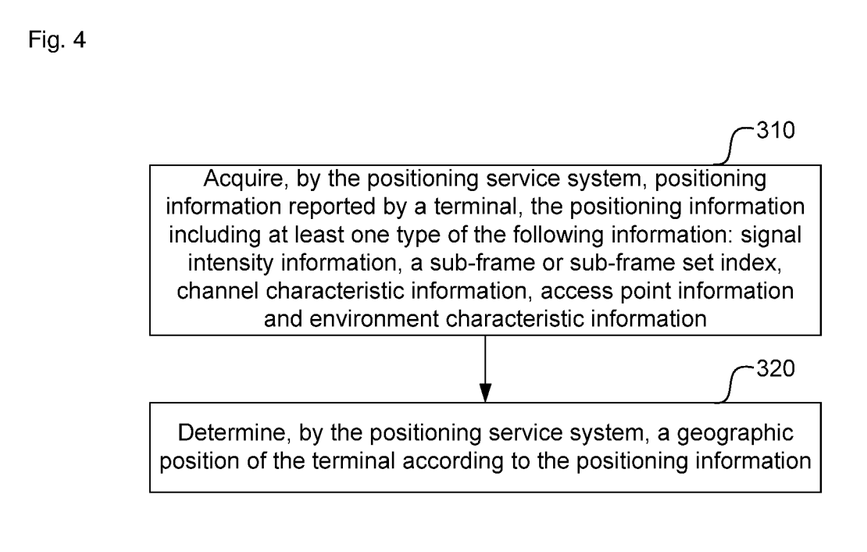
FIG. 4 is a flow diagram of a positioning method applied to a positioning service system according to a first embodiment of the disclosure.

In the present embodiment, a positioning method applied to a positioning service system is shown in FIG. 4, including the following steps.

At Step 310: the positioning service system acquires positioning information reported by a terminal, the positioning information includes at least one type of the following information: signal intensity information, a sub-frame or sub-frame set index, channel characteristic information, access point information and environment characteristic information.

Before this step, the positioning server may configure the transmission position information of the positioning signal and/or the type information for the positioning information to be reported by the terminal, and send the transmission position information of the positioning signal and/or the type information for the positioning information to be reported by the terminal as configured through the transmission node to the terminal. In one example, the transmission position information of the positioning signal includes information of a plurality of sub-frames or a plurality of sub-frame sets on which the positioning signal is sent by each of the cooperative transmission nodes for terminal positioning.

At Step 320: The positioning service system determines a geographic position of the terminal according to the positioning information.

In one example: the positioning information reported by the terminal includes identification information of k access points detected by the terminal, where k is an integer greater than or equal to one; and determining by the positioning service system a geographic position of the terminal according to the positioning information includes: determining, by the positioning service system, geographic positions of the k access points according to the identification information of the k access points reported by the terminal and an established mapping relationship between the identification information and the geographic positions of the access points, and then determining, by the positioning service system, the geographic position of the terminal according to the geographic positions of the k access points.

The positioning service system establishes a mapping relationship between the geographic positions and the identification information of the access point in the following manner:

establishing, by the positioning service system, a mapping relationship between the access points and associated physical ports according to the information reported by the access points or a user; and establishing, by the positioning service system, a mapping relationship between the physical ports and the geographic positions according to a network layout or a network planning or an access point report; or directly establishing, by the positioning service system, the mapping relationship between the identification information and the geographic positions of the access points according to the access points or the identification information and the geographic positions of the access points reported by the terminal accessing the access point.

The step of determining, by the positioning service system, a geographic position of the terminal according to the geographic positions of the k access points includes: determining, by the positioning service system, a geographic area that each of signals of the k access points covers according to the geographic positions of the k access points and coverage of signals of the access points, and using, by the positioning service system, the geographic area commonly covered by the signals of the k access points as a geographic area where the terminal is located.

In order to realize more precise positioning, the terminal can report more positioning information about the access points. For example, the information of the k access points reported by the terminal further includes at least one of intensity information of the signals of the k access points, time advance amount information of the signals of the k access points, and channel characteristic information between the k access points and the terminal.

Accordingly, the positioning service system determines the geographic position of the terminal according to the geographic positions of the k access points, using one or a combination of the following manners:

determining, by the positioning service system, distances from the terminal to the k access points according to the intensity information and/or the time advance amount information of the signals of the k access points respectively, and determining, by the positioning service system, the geographic position of the terminal according to the geographic positions of the k access points; and searching, by the positioning service system, an established mapping relationship between the geographic position and the channel characteristic information between the access points and the terminal according to the channel characteristic information between the k access points and the terminal, and determining the matched geographic position as the geographic position of the terminal.

The combination of a plurality of manners may be to perform weighted average on the coordinate points of the terminals determined in each manner (the weights may be set according to the experience or the statistical results, and the weights are equivalent to the midpoints according to the plurality of points). The coordinate point resulting from weighted average is used as the final geographic position of the terminal. It may be also to determine a geographic area including these positions for the terminal by the coordinate points determined according to each manner. In the disclosure the algorithm at the time of combining is not limited. In addition, the above combination of a plurality of manners includes combination with a geographic area in which the terminal determined according to the access point identification information is located, such as excluding the coordinate points other than the geographic area, and then performing weighted average on the remaining coordinate points, etc.

In another example, the positioning information reported by the terminal further includes: time advance amount information of the positioning signal received by the terminal from each of cooperative transmission nodes for terminal positioning. The step of determining, by the positioning service system, the geographic position of the terminal according to the position information includes: determining, by the positioning service system, a distance from the terminal to each of cooperative transmission nodes according to the time advance amount information of the positioning signal received from each of the cooperative transmission nodes and reported by the terminal respectively, and then determining, by the positioning service system, the geographic position of the terminal according to the geographic position of each of cooperative transmission nodes; determining, by the positioning service system, the geographic position of the terminal according to at least one of the position information including the signal intensity information, the sub-frame or sub-frame set index, the channel characteristic information, the access point information, and the environment characteristic information reported by the terminal; and then determining, by the positioning service system, final geographic position information of the terminal according to a plurality of geographic positions of the terminal determined in a plurality of manners. For the method of determining the final geographic position information of the terminal according to a plurality of geographic positions of the terminals determined in a plurality of manners, refer to the above example. In addition, the angle of the terminal with respect to cooperative transmission node can be determined according to the above positioning information such as the sub-frame or sub-frame set index, and the acquired angle and distance can be used as parameters in the positioning algorithm. The disclosure provides more types of positioning information for the positioning service system, so that positioning by the positioning service system is more accurate.

For example, the positioning information includes a sub-frame or a sub-frame set index, the sub-frame or sub-frame set index including index information of a sub-frame or sub-frame set for which a strongest positioning signal is detected by the terminal from a plurality of sub-frames or a plurality of sub-frame sets on which the positioning signal is transmitted from each of the cooperative transmission nodes in different transmission manners, and at least one of the following transmission parameters being different in the different transmission manners: a transmission port, a beam direction and a precoding mode, and each of the transmission port and the precoding mode corresponds to the beam direction;

before the step of determining, by the positioning service system, the geographic position of the terminal according to the positioning information, the method further includes: acquiring, by the positioning service system, correspondence between indexes of a plurality of sub-frames or sub-frame sets, on which each of the cooperative transmission nodes sends the positioning signal, and the transmission manners according to configuration information; and the step of determining, by the positioning service system, the geographic position of the terminal according to the positioning information includes: determining, by the positioning service system, corresponding transmission manner of each of the cooperative transmission nodes according to the index of the sub-frame or sub-frame set reported by the terminal, so as to determine angle information of the terminal with respect to each of the cooperative transmission nodes, and then determining the geographic position of the terminal according to the geographic position of each of the cooperative transmission nodes. The angle of the terminal with respect to each of the cooperative transmission nodes can be determined directly by the beam direction, or it can be determined according to the beam direction corresponding to the transmission port and the precoding mode.

As another example, the positioning information includes signal intensity information, the signal intensity information including positioning signal intensity information received by the terminal from each of the cooperative transmission nodes for terminal positioning.

The step of determining, by the positioning service system, the geographic position of the terminal according to the positioning information includes that: the positioning service system determines a distance from the terminal to each of the cooperative transmission nodes according to the positioning signal intensity information received from each of the cooperative transmission nodes and reported by the terminal respectively, and then determines the geographic position of the terminal according to the stored geographic position of each of the cooperative transmission nodes.

As another example, the positioning information includes channel characteristic information.

Before the positioning service system determines the geographic position of the terminal according to the positioning information, the positioning service system establishes the mapping relationship between the channel characteristic information and the geographic position of the terminal according to the geographic position associated with the channel characteristic information reported by the terminal.

The step of determining, by the positioning service system, the geographic position of the terminal according to the positioning information includes that: the positioning service system searches the established mapping relationship between the channel characteristic information and the geographic position of the terminal according to the channel characteristic information reported by the terminal, and determines the geographic position of the terminal.

Figure 5:
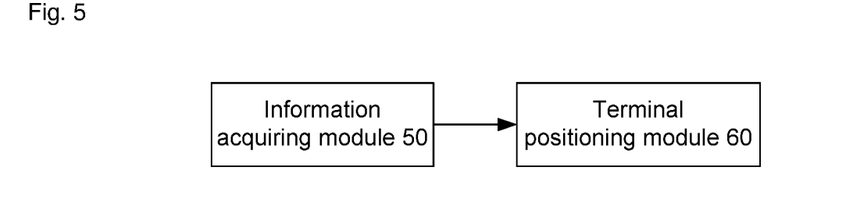
FIG. 5 is a module diagram of a positioning service system according to a first embodiment of the disclosure.

Accordingly, the positioning service system of the present embodiment is shown in FIG. 5. The positioning service system includes: an information acquiring module 50 configured to acquire positioning information reported by a terminal; and a terminal positioning module 60 configured to determine a geographic position of the terminal according to the positioning information. The positioning information includes at least one type of the following information: signal intensity information, a sub-frame or sub-frame set index, channel characteristic information, access point information and environment characteristic information.

The above positioning service system may be located on a device such as a positioning server and also may include a plurality of devices on a physical device. The above information acquiring module and the terminal positioning module may be located on the same or different devices.

In an embodiment, the positioning information acquired by the information acquiring module includes identification information of k access points detected by the terminal, where k is an integer greater than or equal to one. Determining by the terminal positioning module a geographic position of the terminal according to the positioning information includes: determining geographic positions of the k access points according to the identification information of the k access points reported by the terminal and an established mapping relationship between the identification information and the geographic positions of the access points, and then determining the geographic position of the terminal according to the geographic positions of the k access points.

In an embodiment, the terminal positioning module establishes a mapping relationship between the identification information and the geographic positions of the access points:

establishing a mapping relationship between the access points and associated physical ports according to information reported by the access point or a user; and establishing a mapping relationship between the physical ports and the geographic positions according to a network layout or a network planning or an access point report; or directly establishing the mapping relationship between the identification information and the geographic position of the access points according to the access points or the identification information and the geographic positions of the access points reported by the terminal accessing the access points.

In an embodiment, determining by the terminal positioning module a geographic position of the terminal according to the geographic position of the k access points includes: determining a geographic area that each of signals of the k access points covers according to the geographic positions of the k access points and coverage of the signals of the access points, and regarding the geographic area commonly covered by the signals of the k access points as the geographic area where the terminal is located.

In an embodiment, the information of the k access points acquired by the information acquiring module further includes at least one of intensity information of the signals of the k access points, time advance amount information of the signals of the k access points, and channel characteristic information between the k access points and the terminal. The terminal positioning module determines the geographic position of the terminal according to the geographic positions of the k access points using one or a combination of the following manners:

determining a distance from the terminal to the k access points according to the intensity information and/or the time advance amount information of the signals of the k access points respectively, and determining the geographic position of the terminal according to the geographic positions of the k access points; and searching an established mapping relationship between a geographic position and the channel characteristic information between the access points and the terminal according to the channel characteristic information between the k access points and the terminal, and determining the matched geographic position as the geographic position of the terminal.

In an embodiment, the positioning information acquired by the information acquiring module further includes: time advance amount information of the positioning signal received by each of cooperative transmission nodes for terminal positioning. Determining by the terminal positioning module the geographic position of the terminal according to the position information includes:

determining a distance from the terminal to each of the cooperative transmission nodes according to the time advance amount information of the positioning signal received from each of the cooperative transmission nodes and reported by the terminal respectively, and determining the geographic position of the terminal according to the geographic position of each of the cooperative transmission nodes; determining the geographic position of the terminal according to the at least one of the position information in the signal intensity information, the sub-frame or sub-frame set index, the channel characteristic information, the access point information, and the environment characteristic information reported by the terminal; and then determining a final geographic position information of the terminal according to a plurality of geographic positions of the terminals determined in a plurality of manners.

In an embodiment, an information configuration module is included and configured to: configure the transmission position information of the positioning signal and/or the type information for the positioning information to be reported by the terminal, and send the transmission position information of the positioning signal and/or the type information for the positioning information to be reported by the terminal as configured through the transmission node to the terminal. The transmission position information of the positioning signal includes identification information of a plurality of sub-frames or a plurality of sub-frame sets of the positioning signal sent by each of the cooperative transmission nodes for terminal positioning.

In an embodiment, the positioning information acquired by the information acquiring module includes a sub-frame or a sub-frame set index, the sub-frame or sub-frame set index including index information of a sub-frame or sub-frame set for which a strongest positioning signal is detected by the terminal from a plurality of sub-frames or a plurality of sub-frame sets on which the positioning signal is transmitted from each of the cooperative transmission nodes in different transmission manners, and at least one of the following transmission parameters being different in the different transmission manners: a transmission port, a beam direction and a precoding mode, and each of the transmission port and the precoding mode corresponds to the beam direction.

The terminal positioning module is further configured to: acquire, according to the configuration information, correspondence between indexes of a plurality of sub-frames or sub-frame sets and the transmission manner, on which each of the cooperative transmission nodes sends the positioning signal, before determining the geographic position of the terminal according to the positioning information.

The terminal positioning module is configured to determine the geographic position of the terminal according to the positioning information in the following manner: determining corresponding transmission manner of each of the cooperative transmission nodes according to the index of the sub-frame or sub-frame set reported by the terminal so as to acquire angle information of the terminal with respect to each of the cooperative transmission nodes, and determining the geographic position of the terminal according to the geographic position of each of the cooperative transmission nodes.

In an embodiment, the positioning information acquired by the information acquiring module includes positioning signal intensity information received by the terminal from each of the cooperative transmission nodes for terminal positioning; and the terminal positioning module is configured to determine the geographic position of the terminal according to the positioning information in the following manner: determining a distance from the terminal to each of the cooperative transmission nodes according to the positioning signal intensity information received from each of the cooperative transmission nodes and reported by the terminal respectively, and then determining the geographic position of the terminal according to a stored geographic position of each of the cooperative transmission nodes.

In an embodiment, the positioning information acquired by the information acquiring module includes channel characteristic information reported by the terminal. The terminal positioning module is further configured to: establish a mapping relationship between a geographic position and the channel characteristic information of the terminal according to the geographic position associated with the channel characteristic information reported by the terminal. The terminal positioning module is configured to determine the geographic position of the terminal according to the positioning information in the following manner: searching, by the positioning service system, the established mapping relationship between the geographic position and the channel characteristic information of the terminal according to the channel characteristic information reported by the terminal, and determining, by the positioning service system, the geographic position of the terminal.

Second Embodiment

In the present embodiment, the base station sends data using a 3D antenna, and the terminal can feed back more measurement information to the base station based on the received signal. Since the base station cannot know the channel condition from the base station to the terminal, it is possible to transmit the positioning signal using the common broadcast mode.

The base station transmitting the positioning signal (where the base station corresponds to the second transmission node) may be a cooperative base station, for example, the cooperative base station transmits a positioning signal on n sub-frames or sub-frame sets over a period of time, n sub-frames or sub-frame sets correspond to a plurality of transmission modes. For example, a cooperative base station uses k different beams to transmit a positioning signal on the n sub-frames or sub-frame sets, and each of the beams may correspond to one sub-frame or sub-frame set, and may also correspond to a plurality of sub-frames or sub-frame sets. Herein k and n are integers greater than or equal to two. The n, k values of different cooperative base stations may be the same or different.

In addition, the base station (where the base station corresponds to the third transmission node) can send the time-frequency position of the positioning signal to the terminal. The terminal receives the positioning signal according to the position information of the positioning signal sent by the base station, determines the beam with the strongest signal, and transmits the index of the sub-frame or sub-frame set corresponding to the beam to the base station (where the base station corresponds to the first transmission node). In the present embodiment, the base station sending the time-frequency position of the positioning signal is the service base station to which the terminal is currently accessing, and the service base station may be a cooperative base station or may be not a cooperative base station. In the present embodiment, the base station to which the index of the sub-frame or sub-frame set is transmitted is the service base station or the cooperative base station, but the disclosure is not limited thereto.

The above beam situation may also be transparent to the terminal, and the base station transmits the grouping situation of the positioning signal, i.e., which sub-frames correspond to a set of positioning signals. In a time period a set of positioning signals may correspond to one sub-frame, and may also correspond to a sub-frame set including a plurality of sub-frames. After the terminal receives the positioning signal set information, the terminal performs the joint reception on the positioning signals in the same set of positioning signals, and reports the index of the sub-frame or sub-frame set receiving the strongest signal to the base station.

In addition to reporting the index information of the sub-frame or sub-frame set as the positioning information, the terminal may also report other positioning information such as intensity (power) of the received positioning signal, time advance (TA) value detected according to the positioning signal, the path loss amount from the base station to the terminal, the channel characteristic information related to the channel between the base station and the terminal, such as one or more of the precoding information matched with the channel state, the detected multipath information, and a number of paths exceeding a threshold.

The base station transmits the positioning information of the terminal to the positioning server, and the positioning server determines the geographic position of the terminal according to the positioning information together with other information such as the geographic position of the cooperative base station. The position server may transmit the acquired geographic position of the terminal to the core network or application server or terminal.

The position server may determine the distance from the terminal to the corresponding base station using TA and/or signal intensity (path loss amount), and the position server determines the position of the terminal according to the distance information from the plurality of base stations to the terminal. The positioning server may also determine the angle at which the terminal is relative to the base station using the beam direction information corresponding to the precoding information or the beam direction information corresponding to the sub-frame/sub-frame set index, and then determine the position of the terminal according to the angle information of the plurality of base stations with respect to the terminal. The position server may also determine the channel characteristics of the channel between the base station and the terminal according to the multipath information and/or the precoding information and/or the signal intensity (path loss amount), and then determine the terminal position according to the stored mapping relationship between the channel feature and the geographic position. The mapping relationship between the channel feature and the geographic position can be reported by the terminal. The above manner of determining the geographic position of the terminal may be used in combination or alone.

Third Embodiment

The present embodiment realizes the positioning of the terminal by establishing the mapping relationship between the access point (AP) and the geographic position of the assistance positioning system and the access point information reported by the terminal. The assistance position system may be a wireless communication system such as WLAN other than mobile communication.

The establishing process of the above mapping relationship may include the following manners.

First Manner

The positioning service system establishes the mapping relationship between the access point and the associated physical port (such as the network port to which the wireless router as the AP is connected) according to the information reported by the access point or the user; the positioning service system establishes the mapping relationship between the physical port and the geographic position according to the network layout or network planning or access point reporting.

The specific method for establishing the mapping relationship can be automatically identified by the device, can also be manually configured and uploaded, and can also be unified for control through the network planning. For example, when the AP is configured initially, the current geographic position of the AP is set, and the AP automatically uploads its associated physical port to the positioning service system through the connected network. Then, the positioning service system determines the geographic position corresponding to the AP according to the established mapping relationship between the physical port and the geographic position. The mapping relationship between the physical port and the geographic position can be established at the time of network layout or planning, and can also be established when maintenance is performed after the network is established.

Second Manner

The positioning service system directly establishes the mapping relationship between the identification information and the geographic position of the access point according to the access point or the identification information and the geographic position of the access point reported by the terminal accessing the access point.

In addition to the above establishing method, other establishing methods may be adopted.

AP or the terminal accessing the AP uploads the above information through the mobile communication network or the assistance positioning network. The positioning service system stores the above information after receiving the information, and establishes the mapping relationship between the AP and the geographic position for the subsequent terminal positioning.

The access point information includes at least one of: the retrieved information of the k AP access points such as the domain name or the AP server name, the retrieved TA values corresponding to the k access points, the retrieved signal intensity of the k access points and the like, where k is a positive integer greater than or equal to 1.

The selection of the k AP access points may be implemented in the following manner:

k access points detected by the terminal with the largest signal intensity, where k≤K, and K is a preset value; or k access points with the largest signal intensity among access points detected by the terminal with signal intensity exceeding a threshold, where k≤K, and K is a preset value; or k access points detected by the terminal with the signal intensity exceeding the threshold, where k is a number of access points with the actually detected signal intensity exceeding the threshold.

The terminal does not need to have the authorization of accessing the AP, and only needs to have the capability of detecting the AP, so as to position using the AP that has been deployed and the AP information detected by the terminal.

For mobile devices with the assistance positioning system such as wifi function, during the moving process, the assistance positioning system access point (AP) that can be detected is searched, information of the searched access point of the assistance positioning system is transmitted to the positioning service system through the mobile communication network (eg, LTE network, 3G network, 2G network), the positioning service system determines the geographic position of the terminal according to the information (AP related information) transmitted by the terminal and the geographic position information corresponding to the AP, and the geographic position of the terminal can be stored or passed to the core network or application server or terminal. In another embodiment, the positioning service system transmits the mapping relationship between AP and the geographic position through the network to the terminal, and the terminal determines its own position according to the mapping relationship and the detected AP information. The terminal may transmit or not transmit the position information to the core network after determining its own position.

Fourth Embodiment

In the present embodiment, the terminal has a special positioning function. The terminal acquires the environment characteristic information as the positioning information through the corresponding sensor module, and transmits the positioning information to the positioning service system through the network (e.g., LTE network, 3G network, wifi, WLAN). The positioning service system determines the geographic position of the terminal in conjunction with other information (such as information in the second and third embodiments).

The special positioning function specifically includes at least one of an air pressure sensing function, a temperature sensing function, a humidity sensing function, a wind power sensing function, a gravity sensing function, a water pressure sensing function, a specific dedicated positioning signal detecting function, and the like.

The terminal can directly quantize the above environment characteristic information and transmit the quantized environment characteristic information to the positioning service system, and can also transform the information into positioning related information, e.g., determining the vertical height according to the air pressure, determining the water depth according to the water pressure, and determining the special geographic environment (such as indoors or outdoors, in plain or mountain) according to the temperature, humidity and wind power.

The specific dedicated positioning signal detecting function includes that: a service provider providing region positioning passes the position information of the terminal located in the service region to the terminal. Then, the terminal passes the position information to the positioning service system through the network. The position information may be specific geographic position information, and may also be part geographic position information, such as a horizontal or vertical position or the like. The positioning service system may use the information to make comprehensive judgment and finally determine the terminal position.

Fifth Embodiment

The terminal may have one or more of the functions of the above second to fourth embodiments. When the terminal accesses the network, the terminal reports its own functions to the accessed base station, and the base station transmits the functions to the positioning service system. After receiving the functions, the positioning service system may configure a type of the positioning information reported by the terminal and transmit it to the terminal through the transmission node, and the terminal determines the reported type of the positioning information according to the related configuration. The base station may directly issue configuration information to the terminal without acquiring the capability of the terminal, and the terminal selectively reports according to its capability.

The reported positioning information type may be one or more types, and the specific combination may refer to the positioning information (e.g., TA, a sub-frame index or sub-frame set index, precoding information, signal intensity information, multipath information, AP information, environment characteristic information provided by the special function module, etc.) mentioned in the above embodiments for arbitrary combination. The following is only an example, and is not limited to the following description, and the number of the reported types of the positioning information may be 2, 3, 4, 5, etc., for example:

Two types of the positioning information are reported: TA and a sub-frame index (sub-frame set index), or TA and precoding information, or TA and signal intensity information, or TA and multipath information, or AP information and TA, or AP information and environment characteristic information.

Three types of the positioning information are reported:

TA, a sub-frame or sub-frame set index, signal intensity information; or

TA, a sub-frame or sub-frame set index, AP information; or

TA, precoding information, signal intensity; or

TA, signal intensity information and AP information; or

TA, multipath information and AP information; or

TA, AP information, environment characteristic information.

With the above embodiments, the terminal feeds back more or different relevant information to the transmission node, and the transmission node transmits the positioning information to the positioning service system. After acquiring the positioning information, the positioning service system can realize more precise positioning, or realize positioning or satisfy specific positioning demands in a manner different from the traditional manner.

An embodiment of the disclosure further provides a computer storage medium storing computer-executable instructions for performing the above methods applied to a transmission node and a terminal and for positioning a network element.

Those skilled in the art should understand that the embodiments of the disclosure can provide a method, a system or a computer program product. Thus, forms of hardware embodiments, software embodiments or embodiments integrating software and hardware can be adopted in the disclosure. Moreover, a form of the computer program product implemented on one or more computer available storage media (including, but not limited to, a disk memory, an optical memory and the like) containing computer available program codes can be adopted in various embodiments of the disclosure.

The mapping relationship between AP and the geographic position needs to be further confirmed.

The disclosure is described with reference to flowcharts and/or block diagrams of the method, the device (system)

and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus for realizing functions assigned in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide a step of realizing the functions assigned in one or more flows of the flowcharts and/or one or more blocks of the block diagrams.

It is to be understood that the above embodiments are merely for convenience of understanding of those skilled in the art and are not intended to limit the scope of protection of the disclosure, and that any obvious substitutions and improvements made to the disclosure by those skilled in the art are within the scope of the disclosure without departing from the inventive concept of the disclosure.

INDUSTRIAL APPLICABILITY

The terminal feeds back the above specific positioning information to the transmission node such as the base station, and the transmission node transmits the positioning information to the positioning service system. After acquiring the positioning information, the positioning service system can realize more precise positioning, or realize positioning in a new manner and system, or realize special positioning such as positioning of height and water depth, so as to satisfy the related enhanced positioning demands. The disclosure therefore has a good industrial applicability.

What is claimed is:

1. A method for positioning a terminal, wherein the method is applied to the terminal, the method comprising:
   determining a type of positioning information to be acquired according to type information for the positioning information to be reported by the terminal, wherein the type information for the positioning information is configured by a positioning service system and sent to the terminal by a third transmission node;
   acquiring the positioning information of the terminal according to the type of the positioning information; and
   sending the positioning information to a first transmission node, thereby enabling the positioning information to be transmitted by the first transmission node to the positioning service system, so that a geographic position of the terminal is determined by the positioning service system according to the positioning information;
   wherein the positioning information comprises a sub-frame or sub-frame set index, the sub-frame or sub-frame set index comprises index information of a sub-frame or sub-frame set for which a strongest positioning signal is detected by the terminal from a plurality of sub-frames or a plurality of sub-frame sets on which a positioning signal received by the terminal is transmitted from each of cooperative transmission nodes for terminal positioning in different transmission manners, and at least one of the following transmission parameters being different in the different transmission manners: a transmission port, a beam direction or a precoding mode, and each of the transmission port and the precoding mode corresponds to the beam direction; and
   before the step that the geographic position of the terminal is determined by the positioning service system according to the positioning information, the method further comprises: acquiring, by the positioning service system, correspondence between indexes of the plurality of sub-frames or the plurality of sub-frame sets, on which each of the cooperative transmission nodes sends the positioning signal, and the transmission manners according to configuration information; and the step that the geographic position of the terminal is determined by the positioning service system according to the positioning information comprises: determining, by the positioning service system, a corresponding transmission manner of each of the cooperative transmission nodes according to the sub-frame or sub-frame set index reported by the terminal, so as to determine angle information of the terminal with respect to each of the cooperative transmission nodes, and then determining the geographic position of the terminal according to a geographic position of each of the cooperative transmission nodes.

2. The method according to claim 1, wherein the positioning information further comprises: time advance amount information of a positioning signal received by the terminal from the first transmission node.

3. A method for positioning a terminal, wherein the method is applied to a positioning service system, the method comprising:
   acquiring, by the positioning service system, positioning information acquired by the terminal according to a type of the positioning information and reported by the terminal, wherein the positioning information is transmitted by a first transmission node to the positioning service system, and the type of the positioning information is determined by the terminal according to type information for the positioning information configured by the positioning service system and sent to the terminal by a third transmission node; and
   determining, by the positioning service system, a geographic position of the terminal according to the positioning information;
   wherein the positioning information comprises a sub-frame or sub-frame set index, the sub-frame or sub-frame set index comprises index information of a sub-frame or sub-frame set for which a strongest positioning signal is detected by the terminal from a plurality of sub-frames or a plurality of sub-frame sets on which a positioning signal received by the terminal is transmitted from each of cooperative transmission nodes for terminal positioning in different transmission manners, and at least one of the following transmission parameters being different in the different transmission manners: a transmission port, a beam direction or a precoding mode, and each of the transmission port and the precoding mode corresponds to the beam direction;

before the step of determining, by the positioning service system, the geographic position of the terminal according to the positioning information, the method further comprises: acquiring, by the positioning service system, correspondence between indexes of the plurality of sub-frames or the plurality of sub-frame sets, on which each of the cooperative transmission nodes sends the positioning signal, and the transmission manners according to configuration information; and the step of determining, by the positioning service system, the geographic position of the terminal according to the positioning information comprises: determining, by the positioning service system, a corresponding transmission manner of each of the cooperative transmission nodes according to the sub-frame or sub-frame set index reported by the terminal, so as to determine angle information of the terminal with respect to each of the cooperative transmission nodes, and then determining the geographic position of the terminal according to a geographic position of each of the cooperative transmission nodes.

4. The method according to claim 3, wherein before the step of acquiring, by the positioning service system, the positioning information reported by the terminal, the method further comprises:

configuring, by the positioning service system, transmission position information of the positioning signal and/or the type information for the positioning information to be reported by the terminal, and sending, by the positioning service system, the transmission position information of the positioning signal and/or the type information for the positioning information to be reported by the terminal as configured through the third transmission node to the terminal;

wherein the transmission position information of the positioning signal comprises identification information of the plurality of sub-frames or the plurality of sub-frame sets on which the positioning signal is sent by each of the cooperative transmission nodes for terminal positioning.

5. A positionable terminal for performing the method according to claim 1, comprising:

a processor; and a memory for storing instructions executable by the processor;

wherein the processor is configured to:

determine the type of positioning information to be acquired according to the type information for the positioning information to be reported by the terminal, wherein the type information for the positioning information is configured by the positioning service system and sent to the terminal by the third transmission node;

acquire the positioning information of the terminal according to the type of the positioning information; and transmit the positioning information to the first transmission node, thereby enabling the positioning information to be transmitted by the first transmission node to the positioning service system, so that the geographic position of the terminal is determined by the positioning service system according to the positioning information;

wherein the positioning information comprises the sub-frame or the sub-frame set index, the sub-frame or sub-frame set index comprises the index information of the sub-frame or sub-frame set for which the strongest positioning signal is detected by the terminal from the plurality of sub-frames or the plurality of sub-frame sets on which the positioning signal received by the terminal is transmitted from each of the cooperative transmission nodes in the different transmission manners, and at least one of the following transmission parameters being different in the different transmission manners: the transmission port, the beam direction or the precoding mode, and each of the transmission port and the precoding mode corresponds to the beam direction; and wherein the processor is further configured to, before the step that the geographic position of the terminal is determined by the positioning service system according to the positioning information: acquire, by the positioning service system, the correspondence between the indexes of the plurality of sub-frames or the plurality of sub-frame sets, on which each of the cooperative transmission nodes sends the positioning signal, and the transmission manners according to the configuration information; and the processor is configured to determine, by the positioning service system, the geographic position of the terminal according to the positioning information by: determining, by the positioning service system, the corresponding transmission manner of each of the cooperative transmission nodes according to the sub-frame or sub-frame set index reported by the terminal, so as to determine the angle information of the terminal with respect to each of the cooperative transmission nodes, and then determining the geographic position of the terminal according to the geographic position of each of the cooperative transmission nodes.

6. A positioning service system for performing the method according to claim 3, comprising:

a processor; and a memory for storing instructions executable by the processor;

wherein the processor is configured to:

acquire the positioning information acquired by the terminal according to the type of the positioning information and reported by the terminal, wherein the positioning information is transmitted by the first transmission node to the positioning service system, and the type of the positioning information is determined by the terminal according to the type information for the positioning information configured by the positioning service system and sent to the terminal by the third transmission node; and determine the geographic position of the terminal according to the positioning information;

wherein the positioning information comprises the sub-frame or sub-frame set index, the sub-frame or sub-frame set index comprises the index information of the sub-frame or sub-frame set for which the strongest positioning signal is detected by the terminal from the plurality of sub-frames or the plurality of sub-frame sets on which the positioning signal received by the terminal is transmitted from each of the cooperative transmission nodes in the different transmission manners, and at least one of the following transmission parameters being different in the different transmission manners: the transmission port, the beam direction or the precoding mode, and each of the transmission port and the precoding mode corresponds to the beam direction;

wherein the processor is further configured to, before the step of determining, by the positioning service system, the geographic position of the terminal according to the positioning information: acquire, by the positioning service system, the correspondence between the indexes of the plurality of sub-frames or the plurality of sub-frame sets, on which each of the cooperative transmission nodes sends the positioning signal, and the transmission manners according to the configuration information; and wherein the processor is configured to determine, by the positioning service system, the geographic position of the terminal according to the positioning information by: determining, by the positioning service system, the corresponding transmission manner of each of the cooperative transmission nodes according to the sub-frame or sub-frame set index reported by the terminal, so as to determine the angle information of the terminal with respect to each of the cooperative transmission nodes, and then determining the geographic position of the terminal according to the geographic position of each of the cooperative transmission nodes.

7. A method for positioning a terminal, wherein the method is applied to a positioning service system, the method comprising:

acquiring, by the positioning service system, positioning information acquired by the terminal according to a type of the positioning information and reported by the terminal, wherein the positioning information is transmitted by a first transmission node to the positioning service system, and the type of the positioning information is determined by the terminal according to type information for the positioning information configured by the positioning service system and sent to the terminal by a third transmission node; and determining, by the positioning service system, a geographic position of the terminal according to the positioning information;

wherein the positioning information comprises channel characteristic information, the channel characteristic information comprises precoding mode information of a reference signal;

the method further comprises: before the step of determining, by the positioning service system, the geographic position of the terminal according to the positioning information, establishing, by the positioning service system, a mapping relationship between the channel characteristic information and the geographic position of the terminal according to the geographic position associated with the channel characteristic information reported by the terminal; and the step of determining, by the positioning service system, the geographic position of the terminal according to the positioning information comprises: searching, by the positioning service system, an established mapping relationship between the channel characteristic information and the geographic position of the terminal according to the channel characteristic information reported by the terminal, and determining, by the positioning service system, the geographic position of the terminal.

* * * * *